United States Patent
Ilkorur et al.

(10) Patent No.: US 12,107,472 B2
(45) Date of Patent: Oct. 1, 2024

(54) SHAKER FOR ELECTRONIC DEVICE (71) Applicant: Apple Inc., Cupertino, CA (US)

(72) Inventors: Onur I. Ilkorur, Campbell, CA (US); Xin Luo, Sunnyvale, CA (US); Christopher Wilk, Los Gatos, CA (US); Aneesh R. Kudekar, Campbell, CA (US)

(73) Assignee: Apple Inc., Cupertino, CA (US)

( * ) Notice: Subject to any disclaimer, the term of this patent is extended or adjusted under 35 U.S.C. 154(b) by 830 days.

(21) Appl. No.: 17/127,977

(22) Filed: Dec. 18, 2020

(65) Prior Publication Data

US 2022/0200432 A1 Jun. 23, 2022

(51) Int. Cl.
*H02K 33/18* (2006.01)
*H02P 25/034* (2016.01)
*H04R 9/02* (2006.01)
*H04R 11/02* (2006.01)

(52) U.S. Cl.
CPC ........... *H02K 33/18* (2013.01); *H02P 25/034* (2016.02); *H04R 9/025* (2013.01); *H04R 11/02* (2013.01)

(58) Field of Classification Search
None
See application file for complete search history.

(56) References Cited

U.S. PATENT DOCUMENTS

| | | | |
|---|---|---|---|
| 6,252,744 B1 | 6/2001 | Kelemen | |
| 6,810,128 B2 * | 10/2004 | Kaneda | H04R 9/066 381/396 |
| 6,850,138 B1 | 2/2005 | Sakai | |
| 7,035,423 B2 * | 4/2006 | Kaneda | B06B 1/0207 381/396 |
| 7,076,079 B2 * | 7/2006 | Chung | H04R 1/00 381/396 |
| 10,080,081 B1 | 9/2018 | Zhang | |
| 10,462,574 B1 | 10/2019 | Gomes et al. | |

(Continued)

FOREIGN PATENT DOCUMENTS

| | | |
|---|---|---|
| CN | 1695779 A | 11/2005 |
| CN | 103209227 A | 7/2013 |

(Continued)

OTHER PUBLICATIONS

Geng et al., "The mathematical-physical model of electro-magnetic actuator screen sound system," Journal of Applied Acoustics, Nov. 2019, vol. 38, No. 6, 11 pages.

(Continued)

*Primary Examiner* — Clayton E. LaBalle
*Assistant Examiner* — Diana Hancock
(74) *Attorney, Agent, or Firm* — BAKERHOSTETLER (57) ABSTRACT

Aspects of the subject technology relate to a shaker module for an electronic device. The shaker module may include a movable component that is resiliently suspended in relation to a voice coil by one or more gap-separated pairs of the flat springs. The flat springs reduce the z-height of the shaker module for implementation in, for example, compact electronic devices. The gap-separated pairs of flat springs facilitate adjustment of the resonance frequency of the shaker module substantially independently of adjustments to drop performance, while providing stability against unwanted rocking motions of the movable component.

21 Claims, 6 Drawing Sheets

(56) References Cited

U.S. PATENT DOCUMENTS

| | | | |
|---|---|---|---|
| 10,880,653 B2 | 12/2020 | Ilkorur et al. | |
| 2001/0017922 A1* | 8/2001 | Kim | H04R 9/06 381/430 |
| 2002/0096944 A1 | 7/2002 | Crane et al. | |
| 2006/0110001 A1 | 5/2006 | Saint Vincent et al. | |
| 2007/0237352 A1 | 10/2007 | Andersen et al. | |
| 2020/0177998 A1 | 6/2020 | Gomes et al. | |
| 2020/0200995 A1* | 6/2020 | Lee | G02B 7/09 |
| 2020/0374633 A1 | 11/2020 | Ilkorur et al. | |

FOREIGN PATENT DOCUMENTS

| | | |
|---|---|---|
| CN | 209980188 U | 1/2020 |
| CN | 110941330 A | 3/2020 |
| JP | 2006-093774 A | 4/2006 |
| JP | 2009-248798 A | 10/2009 |
| JP | 2011-199595 A | 10/2011 |
| KR | 101148055 B1 | 5/2012 |

OTHER PUBLICATIONS

Kashima et al., "Two-dimensional noncontact transportation of small objects in air using flexural vibration of a plate," IEEE International Ultrasonics Symposium Proceedings, 2014. pp 463-466.

Zhao, et al., "Design and analysis of magnetic circuit based on bow-type GMM pronunciation vibrator," Journal Magnetic Materials and Devices, May 2016, vol. 47, No. 2, 7 pages.

Chinese Office Action from Chinese Patent Application No. 202111312929.4, dated Nov. 27, 2023, 20 pages including English language Summary.

Chinese Office Action from Chinese Patent Application No. 202111312929.4, dated Apr. 4, 2024, 15 pages including English language Summary.

Chinese Office Action from Chinese Patent Application No. 202111312929.4, dated Jun. 24, 2024, 11 pages including English language summary.

* cited by examiner

SHAKER FOR ELECTRONIC DEVICE

TECHNICAL FIELD

The present description relates generally to electronic devices, and more particularly, but not exclusively, to shakers for electronic devices.

BACKGROUND

Electronic devices such as computers, media players, cellular telephones, and other electronic equipment are often provided with acoustic components such as speakers for generating audio output. However, it can be challenging to integrate acoustic components that can generate low frequency sounds into electronic devices, such as in compact devices including portable electronic devices.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Electronic devices such as desktop computers, televisions, set top boxes, internet-of-things (IoT) devices, wearable devices such as headphones and earbuds, and portable electronic devices including a mobile phones, portable music players, smart watches, tablet computers, smart speakers, remote controllers for other electronic devices, and laptop computers often include one or more acoustic components such as speakers for generating audio output from the device, and/or one or more haptic components that generate tactile feedback or other motion or vibration of a device or a portion of a device.

Particularly in compact electronic devices such as wearable electronic devices and portable electronic devices, it can be difficult to provide speakers and/or haptic components that can generate or simulate low frequency sounds and/or vibrations, due to the small volume available for the component.

In accordance with various aspects of the subject disclosure, a shaker module for an electronic device is provided. The shaker module can be mounted within a constrained z-height within the electronic device that is designated for the module. The shaker module can be attached to a wall or other structure of the electronic device, such as to an interior surface of a housing of the electronic device. The shaker module can be operated to generate and/or mimic low-frequency audio output by the device, and/or to provide a haptic output for the device.

In one or more implementations, the shaker module may include a moving element and may be arranged to prevent rocking motion of the moving element while allowing out-of-plane movement of the moving element. The shaker module may also be arranged to prevent in-plane movement of the moving element. In one or more implementations, the disclosed shaker module may include two layers of flat springs that are separated by a vertical gap, the flat springs each extending parallel to a common plane. The two flat springs may be arranged to cooperate to allow linear actuation of the moving element in a direction perpendicular to the common plane and to prevent rocking of the moving element relative to the common plane. The two flat springs may also help prevent damage to the shaker in a drop event, such as by allowing the moving element to be temporarily and resiliently displaced by a drop impact to the electronic device.

Figure 1:
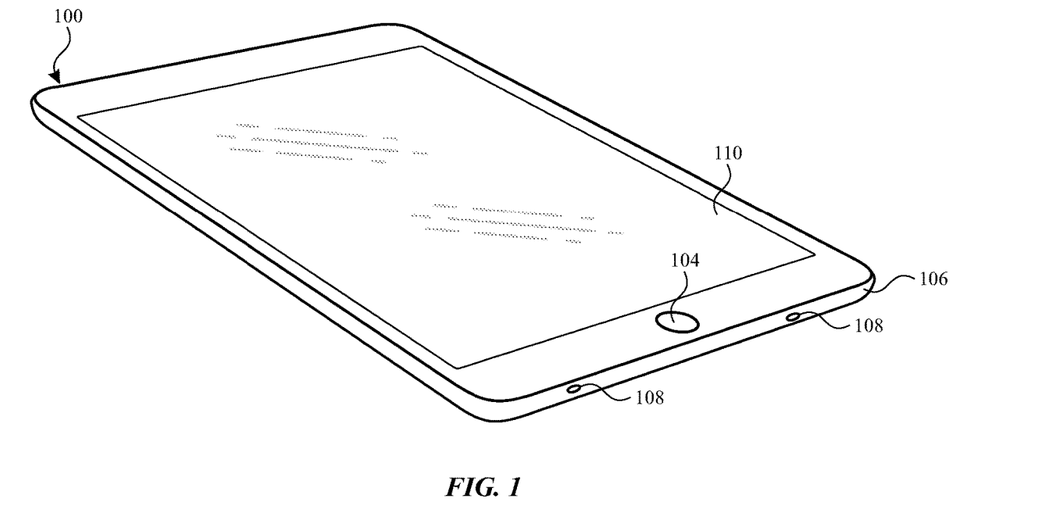
FIG. 1 illustrates a perspective view of an example electronic device having a shaker in accordance with various aspects of the subject technology.

An illustrative electronic device including a shaker module is shown in FIG. 1. In the example of FIG. 1, electronic device 100 (e.g., an electronic device) has been implemented using a housing that is sufficiently small to be portable and carried by a user (e.g., electronic device 100 of FIG. 1 may be a handheld electronic device such as a tablet computer or a cellular telephone or smart phone). As shown in FIG. 1, electronic device 100 includes a display such as display 110 mounted on the front of housing 106. Electronic device 100 may include one or more input/output devices such as a touch screen incorporated into display 110, a virtual or mechanical button or switch such as button 104, and/or other input output components disposed on or behind display 110 or on or behind other portions of housing 106. Display 110 and/or housing 106 include one or more openings to accommodate button 104, a speaker, a light source, a microphone, and/or a camera.

In the example of FIG. 1, housing 106 includes openings 108 along an edge (e.g., a bottom edge) of housing 106. In this example, openings 108 form ports for acoustic components such as speakers and/or microphones. For example, one of the openings 108 may form a microphone port for a microphone assembly disposed within housing 106. Another of the openings 108 in housing 106 may form a speaker port for a speaker disposed within housing 106.

Housing 106, which may sometimes be referred to as a case, may be formed of plastic, glass, ceramics, fiber composites, metal (e.g., stainless steel, aluminum, etc.), other suitable materials, or a combination of any two or more of these materials. In one example, housing 106 may be formed from a metal peripheral portion that runs (e.g., continuously or in pieces) around the periphery of electronic device 100, and a metal or glass rear panel mounted to the metal peripheral portion. In this example, an enclosure may be formed by the metal peripheral portion, the rear panel, and display 110, so that device circuitry such as a shaker module, a battery, one or more processors, memory, application specific integrated circuits, sensors, antennas, acoustic components, and the like are housed within this enclosure.

However, it should be appreciated that the configuration of electronic device 100 of FIG. 1 is merely illustrative. In other implementations, electronic device 100 may be a computer such as a computer that is integrated into a display such as a computer monitor, a laptop computer, a tablet device, a somewhat smaller portable device such as a smart watch, a pendant device, a wearable device, a miniature device, a media player, a gaming device, a navigation device, a computer monitor, a television, a headphone, or other electronic equipment.

For example, in some implementations, housing 106 may be formed using a unibody configuration in which some or all of housing 106 is machined or molded as a single structure or may be formed using multiple structures (e.g., an internal frame structure, one or more structures that form exterior housing surfaces, etc.). Although housing 106 of FIG. 1 is shown as a single structure, housing 106 may have multiple parts. For example, in other implementations, housing 106 may have upper portion and lower portion coupled to the upper portion using a hinge that allows the upper portion to rotate about a rotational axis relative to the lower portion. A keyboard such as a QWERTY keyboard and a touch pad may be mounted in the lower housing portion, in some implementations.

In some implementations, electronic device 100 may be provided in the form of a computer integrated into a computer monitor and/or other display, such as a television. Display 110 may be mounted on a front surface of housing 106 and optionally a stand may be provided to support housing 106 (e.g., on a desktop) and/or housing 106 may be mounted on a surface, such as a wall.

In some implementations, electronic device 100 may be provided in the form of a wearable device such as a smart watch. For example, in some implementations, housing 106 may include one or more interfaces for mechanically coupling housing 106 to a strap or other structure for securing housing 106 to a wearer. In some implementations, electronic device 100 may be a mechanical or other non-electronic device in which a speaker, a microphone, or a shaker module can be mounted within the housing, such as a pen or a support structure such as a monitor stand for a computer monitor. In any of these exemplary implementations, housing 106 includes an opening 108 associated with a microphone assembly.

In order to generate and/or simulate sounds, such as sounds having frequencies that are lower than the frequencies capable of being generated by the speaker(s) of the electronic device 100, and/or to generate tactile (e.g., vibratory) output from the electronic device, one or more shaker modules may be disposed within the housing. The shaker module may be attached to a portion of the housing 106 and/or to one or more other structures of the electronic device 100, and operable to impart movement (e.g., vibration) to the housing and/or other structures. For example, the shaker module may be attached to a portion of the housing 106 such that, when the shaker module is operated, the portion of the housing to which the shaker module is attached correspondingly vibrates. In this way, the housing 106 itself (e.g., or a portion thereof) can be used as a radiating surface for projecting and/or simulating sound (e.g., low frequency sound) from the electronic device.

Figure 2:
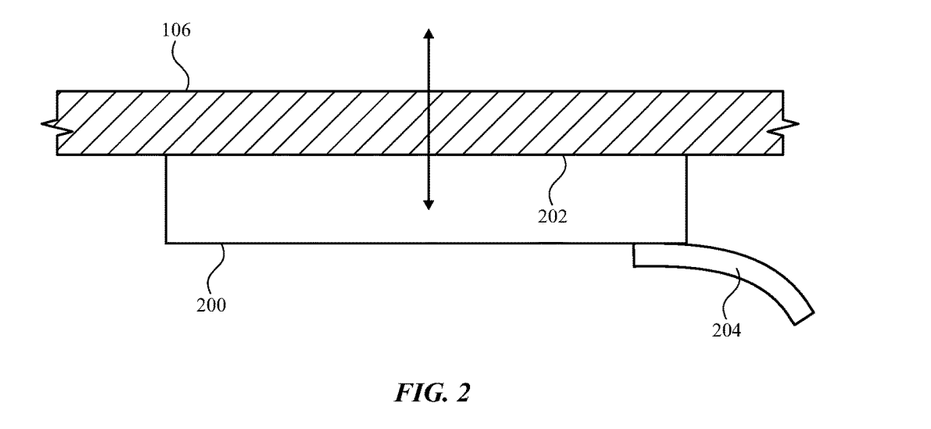
FIG. 2 illustrates a cross-sectional view of a portion of an electronic device including a shaker module coupled to a housing of the device in accordance with various aspects of the subject technology.

For example, FIG. 2 illustrates a cross-sectional view of a portion of electronic device 100 in an implementation in which a shaker module 200 is attached to an interior surface 202 of the housing 106. As shown, a connector 204 such as a flexible printed circuit or other electrical connector may be coupled to the shaker module 200 to provide control signals (e.g., from system circuitry such as one or more processors of the electronic device) for operation of the shaker module 200. The arrows in FIG. 2 indicate how, responsive to the operation of the shaker module, a portion of the housing 106 to which the shaker module is attached may be actuated (e.g., in a direction perpendicular to a plane defined the housing and/or by the shaker module), which can cause the housing 106 to generate and/or simulate low frequency sounds (e.g., sounds having frequencies that are lower than the frequencies capable of being generated by a speaker of the electronic device).

Figure 3:
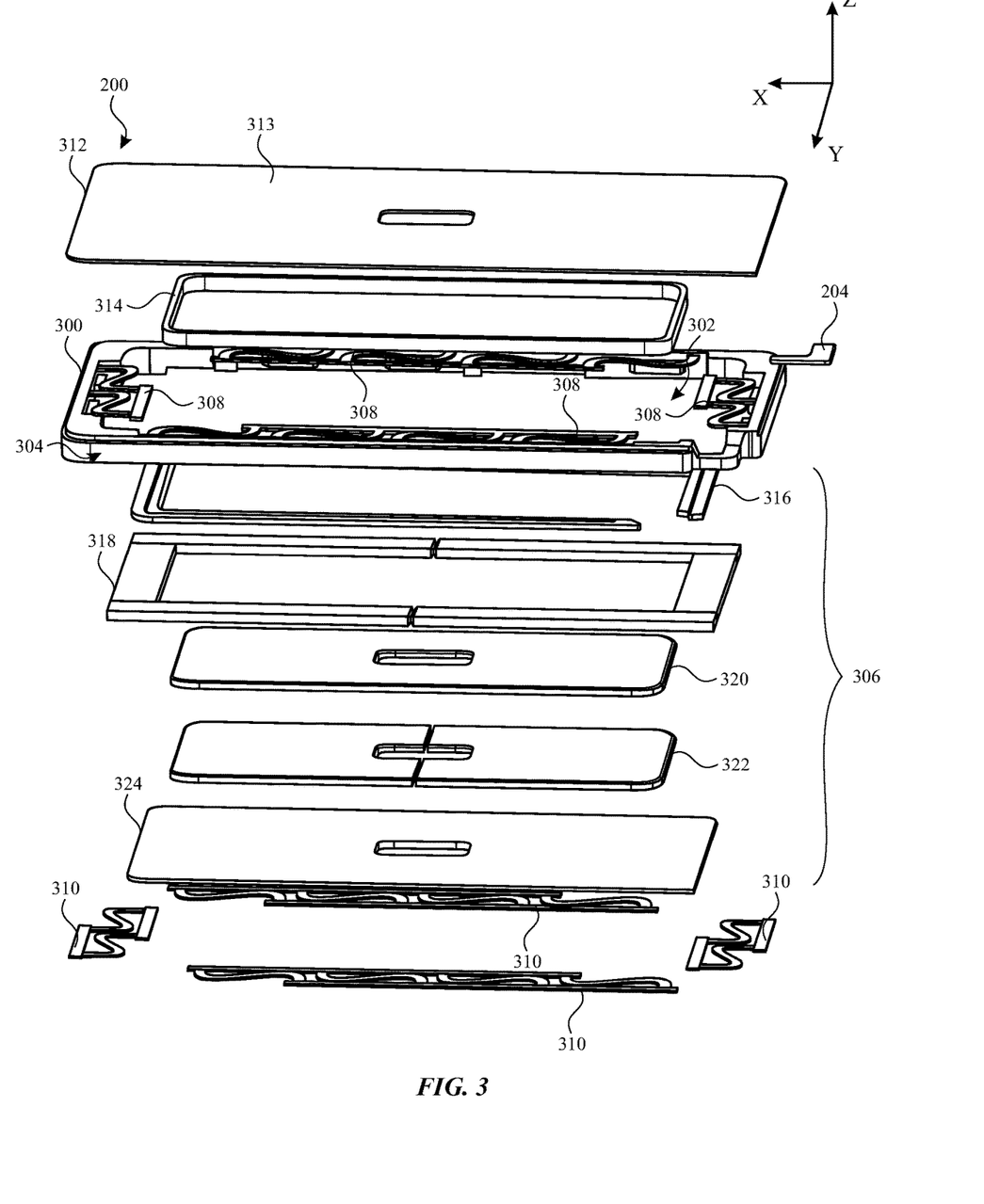
FIG. 3 illustrates an exploded perspective view of a shaker module in accordance with various aspects of the subject technology.

FIG. 3 illustrates an exploded perspective view of shaker module 200, in accordance with one or more implementations. As shown in FIG. 3, shaker module 200 may include a frame 300. As shown, frame 300 may be form a rectilinear (e.g., substantially rectangular in FIG. 3) annulus that provides a support structure for the other elements of shaker module 200. In this arrangement, frame 300 may define an interior opening 302 and at least a portion of an outer peripheral edge 304 of the shaker module 200. The outer peripheral edge 304 may define a plane (e.g., a plane parallel to the x-y plane shown in FIG. 3) that extends through the interior opening 302 (e.g., through the entire interior opening 302 and through points around the entire outer peripheral edge). As shown, the frame 300 may have a thickness in the direction perpendicular to the plane (e.g., a thickness that extends from a bottom end to a top end in the z-direction of FIG. 3). As examples, the plane may be defined by at least three points on the top end of the outer peripheral edge 304, by at least three points on the bottom end of the outer peripheral edge 304, or by at least three points on the outer peripheral edge and at any common vertical distance between the top end and bottom end of the outer peripheral edge 304.

A movable component 306 may be disposed within the interior opening 302 in the frame 300 (e.g., when the shaker module is assembled, as discussed further below in connection with FIG. 4). As shown in FIG. 3, the shaker module 200 may include one or more first flat springs 308 (e.g., four first flat springs 308 disposed around the interior edge of the frame 300) that extend, parallel to the plane (e.g., parallel to the plane defined by the outer peripheral edge of the frame and parallel to the x-y plane in FIG. 3). The shaker module 200 may also include one or more second flat springs 310 that are each separated from a first flat spring 308 along a direction perpendicular to plane (e.g., along the z-direction shown in FIG. 3). As shown, each second flat spring 310 extends, parallel to a corresponding first flat spring 308 and to the plane (e.g., the x-y plane).

In the example of FIG. 3, the movable component 306 includes a magnet assembly that includes a ring plate 316, a side magnet 318, a center plate 320, a center magnet 322, and a yoke 324. In the example of FIG. 3, the shaker module 200 also includes a stiffener plate 312 having a first side 313. In one or more implementations, the first side 313 of the stiffener plate 312 can be attached to the interior surface 202 of housing 106 (e.g., as illustrated in FIG. 2), and/or to another surface and/or structure of electronic device 100. Frame 300 may be attached to an opposing second side of the stiffener plate 312. As shown in FIG. 3, shaker module 200 may also include a coil 314 such as a voice coil (e.g., formed by a plurality of windings of a conductive wire to form an annular coil of the wire around a central opening that forms a bore). The coil 314 may also be attached to the second side of the stiffener plate 312 such that the coil 314 is centrally mounted within the interior opening 302 in the frame 300 in an assembled configuration. In one or more implementations, a connector such as connector 204 (e.g., a flexible printed circuit) can be coupled to coil 314 (e.g., via frame 300) to provide control signals (e.g., from system circuitry of electronic device 100 to the coil). The control signals may be used to drive a current in the coil 314 that causes the magnet assembly to actuate (e.g., along the z-direction of FIG. 3).

Figure 4:
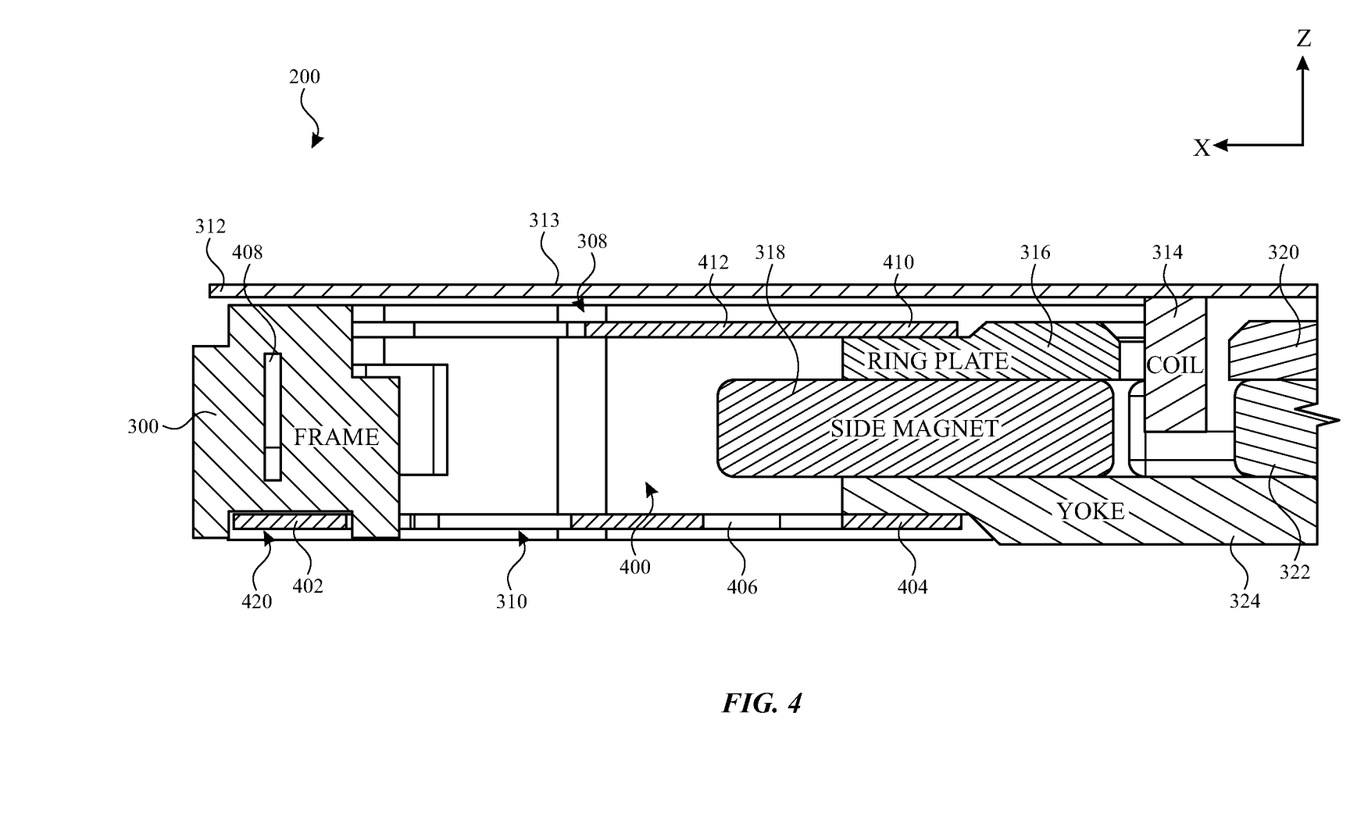
FIG. 4 illustrates a cross-sectional side view of a portion of a shaker module in accordance with various aspects of the subject technology.

FIG. 4 illustrates a cross-sectional side view of a portion of the shaker module 200 of FIG. 3, in an assembled configuration. The portion of the shaker module 200 that is shown in FIG. 4 includes one of the four first flat springs 308 of FIG. 3 and one of the four second flat springs 310 of FIG. 3. FIGS. 3 and 4 illustrate how the shaker module 200 may include one or more first flat springs 308 that extend, parallel to the plane (e.g., parallel to the plane defined by the outer peripheral edge of the frame and parallel to the x-y plane in FIGS. 3 and 4), from the frame 300 to the movable component 306 (e.g., to the ring plate 316). FIGS. 3 and 4 also illustrate how the shaker module 200 may also include one or more second flat springs 310 that are each separated from a first flat spring 308 along a direction perpendicular to plane (e.g., along the z-direction shown in FIGS. 3 and 4). In the portion of shaker module 200 that is shown in FIG. 4, it can be seen that the second flat spring 310 extends, parallel to a corresponding first flat spring 308 and to the plane, between the frame 300 and the movable component 306 (e.g., to the yoke 324). As shown, the first flat spring 308 and the second flat spring 310 each has a thickness in the direction perpendicular to the plane (e.g., the z-direction of FIGS. 3 and 4), and each is substantially flat in dimensions parallel to the plane (e.g., the springs extend within a plane parallel to the x-y plane of FIGS. 3 and 4, without bending or curving out of that plane).

In the assembled configuration of shaker module 200 illustrated by the portion of shaker module 200 that is shown in FIG. 4 (e.g., an assembled configuration in which the four first flat springs 308 and the four second flat springs 310 of FIG. 3 are mounted between the frame and the magnet assembly similarly to the first flat spring 308 and the second flat spring 310 shown in FIG. 4), the first flat springs 308 and the second flat springs 310 may cooperate to permit resilient movement of the movable component 306 in the direction perpendicular to the plane (e.g., resilient movement in the z-direction of FIGS. 3 and 4), to prevent movement of the movable component within the plane, and to prevent rotation of the movable component 306 out of the plane.

In the example of FIG. 4, the stiffener plate 312 is attached to the frame 300 (e.g., by an adhesive, a weld such as a vibration weld, or by one or more fasteners or other attachment mechanisms). Coil 314 may be coupled to (e.g., attached to or otherwise mounted to) the stiffener plate 312. The movable component 306 (e.g., including the ring plate 316, side magnet 318, center plate 320, center magnet 322, and yoke 324) may include a portion of the magnet assembly (e.g., including the center plate 320 and center magnet 322) that is positioned within the coil 314 by the first flat spring 308, the second flat spring 310, and the yoke, as shown. In the example of FIG. 4, the side magnet 318 is positioned (e.g., by the ring plate 316 and the yoke 324) to extend around and in proximity to the outer edge of coil 314, and the center magnet is positioned by the yoke 324 at least partially within the bore of the coil 314. In this way, the coil 314 may be operable to cause movement of the magnet assembly in the direction perpendicular to the plane (e.g., in the z-direction of FIGS. 3 and 4, responsive to magnetic fields generated by the coil that interact with the magnetic fields of the side magnet and center magnet).

Any or all of the first flat springs 308 and the second flat springs 310 of FIGS. 3 and 4 may be formed from relatively hard materials such as non-magnetic steel or steel alloy (e.g., "SUS 301" or "SUS 304"). Such hard materials may allow the springs to have a flat configuration as shown while providing resilient positioning of the movable component 306 in the z-direction and sufficient in-plane strength to prevent damage to the shaker module from an impact that includes an in-plane force component.

In the cross-sectional view of FIG. 4, the thickness of the first flat spring 308 and the second flat spring 310 in the z-direction can be seen, as well as the substantially flat arrangement of each of the first flat spring 308 and the second flat spring 310 within a plane that is perpendicular to the z-direction. The thickness of the frame 300 in the z-direction can also be seen. FIG. 4 also shows how a first flat spring 308 and a second flat spring 310 may form a gap-separated pair of flat springs that are separated by a gap 400 in the z-direction. This separation of the two layers of flat springs by gap 400 provides rotational stability for the magnet assembly (e.g., including the ring plate 316, side magnet 318, center plate 320, center magnet 322, and yoke 324) that prevents rotation or rocking of the magnet assembly (e.g., rotation of the magnet assembly out of a plane parallel to the x-y plane).

The example of FIG. 4 also illustrates how a first flat spring 308 may include an outer beam 408, an inner beam 410, and a flat spring element 412 that extends, parallel to the plane (e.g., parallel to the x-y plane) from the outer beam 408 to the inner beam 410. As shown, a second flat spring 310 that is separated from the first flat spring 308 by gap 400 may include an outer beam 402, an inner beam 404 and a flat spring element 406 that extends, parallel to the plane (e.g., parallel to the x-y plane), from the outer beam 402 to the inner beam 404. In the example of FIG. 4, the outer beam 408 includes a bend that is molded within the frame 300. However, in other implementations, the outer beam 408 may be substantially flat without any bends.

As shown in FIG. 4, in the assembled configuration of shaker module 200, the outer beam 408 of the first flat spring 308 may be attached to (e.g., insert molded into) the frame 300, the inner beam 410 of the first flat spring 308 may be attached (e.g., welded such as laser welded) to the ring plate 316 of the magnet assembly, the outer beam 402 of the second flat spring 310 may be attached to (e.g., secured within a notch 420 in) the frame 300, and the inner beam 404 of the second flat spring 310 may be attached (e.g., welded such as laser welded) to a yoke 324 of the magnet assembly. As shown, side magnet 318 may have a (e.g., rectilinear) annular shape and may be attached, on a first side, to a bottom surface of the ring plate 316, and on an opposing second side, to a top surface of the yoke 324. In this arrangement, the ring plate 316 and the side magnet 318 extend around an outer edge of the coil 314.

As shown, yoke 324 may extend from a portion that is mounted between the inner beam 404 of the second flat spring 310 and the side magnet 318, under the coil 314, to a central portion that supports the center magnet 322 at a position within the bore of the coil 314.

Figure 5:
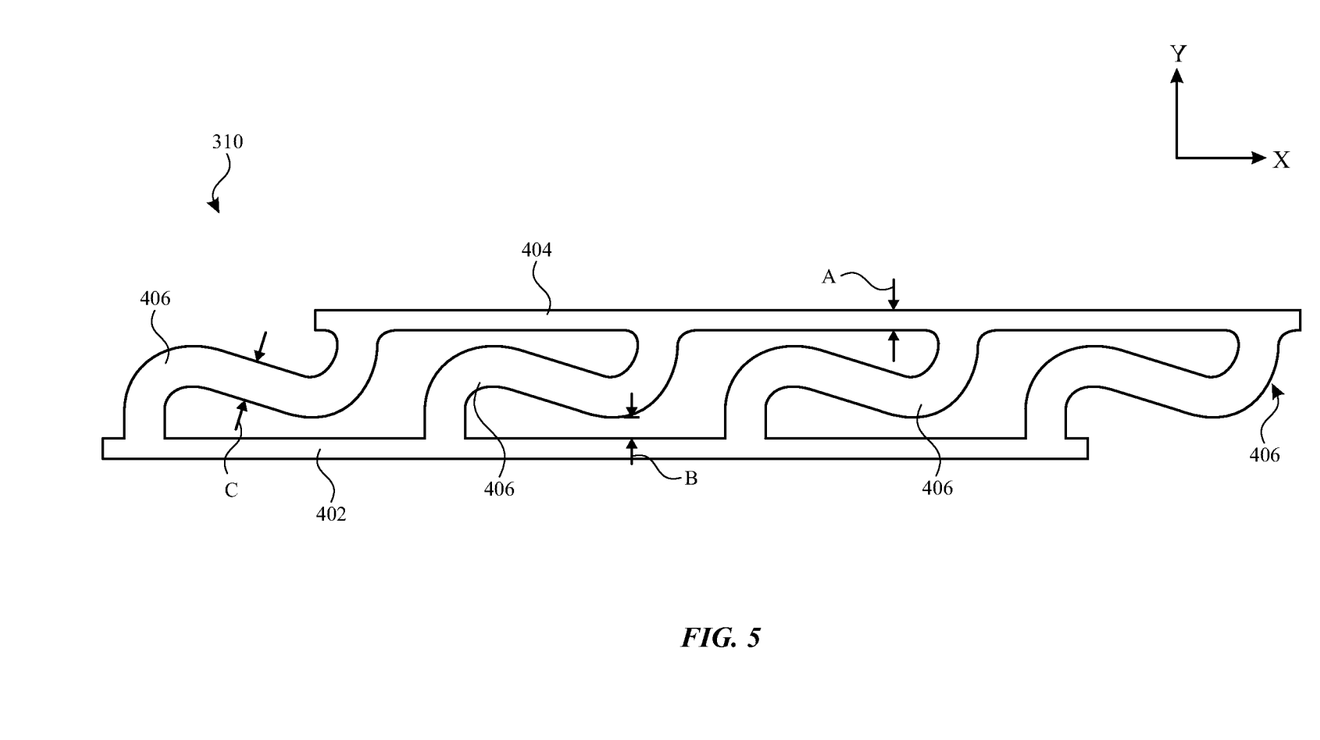
FIG. 5 illustrates a top view of an exemplary flat spring of a shaker module in accordance with various aspects of the subject technology.

FIG. 5 illustrates a top view of an example flat spring for the shaker module 200 in accordance with aspects of the disclosure. In the example of FIG. 4, a second flat spring 310 is shown including an outer beam 402, an inner beam 404, and a plurality of flat spring elements 406 that each extends from the outer beam 402 to the inner beam 404 along a corresponding curved path that is parallel to the plane (e.g., the x-y plane). In the example of FIG. 5, the second flat spring 310 includes four flat spring elements 406. In the example of FIG. 5, each flat spring element extends, within the x-y plane, along a similarly shaped s-curve from the outer beam 402 to the inner beam 404.

In various implementations, a first flat spring 308 or a second flat spring 310 may include one, two, three, four, or more than four flat spring elements. In various implementations, the one, two, three, four, or more than four flat spring elements of a flat spring may have a common curved shape (e.g., an s-curve) as in the example of FIG. 5. In other implementations, one or more of the one, two, three, four, or more than four flat spring elements of a flat spring may have a shape that is different from the illustrated s-shape. For example, one or more of the one, two, three, four, or more than four flat spring elements may extend along a curved path that includes fewer or more in-plane bends than the two in-plane bends of the s-curves of FIG. 5.

As shown in FIG. 5, the inner beam 404 is offset from the outer beam 402, the inner and outer beams have a width A, the flat spring elements are separated from the inner and outer beams by a minimum distance B that is less than the width A, and the flat spring elements 406 have a width C that is greater than the minimum distance B and the width A. In one or more implementations, the width A may be between, for example, 0.4 and 0.7 millimeters (mm). In one or more implementations, the minimum distance B may be between, for example, 0.2 and 0.5 mm. In one or more implementations, the width C may be between, for example, 1 mm and 1.3 mm.

The exemplary s-shaped flat spring arrangement of the first flat spring(s) 308 and second flat spring(s) 310 described herein provides mechanical and design advantages over other mounting arrangements for a magnet assembly. For example, in addition to the low z-height of the flat arrangement, the s-shaped flat spring elements include curves (e.g., in-plane curves), but do not include bending points that could form weak spots for fatigue development over time.

In this s-shaped flat spring arrangement, the drop performance of the shaker module can be improved (e.g., by modifying the geometry, length, and/or path of the s-shape of the flat spring elements) substantially independently from the resonance frequency performance (e.g., which can be modified by modifying the thickness of the flat springs), in contrast with other spring arrangements in which harder materials for improved drop performance could raise the minimum resonance frequency that can be achieved by the shaker component. Moreover, the flat spring arrangement described herein provides improved shape stability under laser welding (e.g., when laser welding the first flat spring(s) 308 to the ring plate 316 and/or when laser welding the second flat spring(s) 310 to the yoke 324) in comparison with other non-flat spring arrangements.

Figure 6:
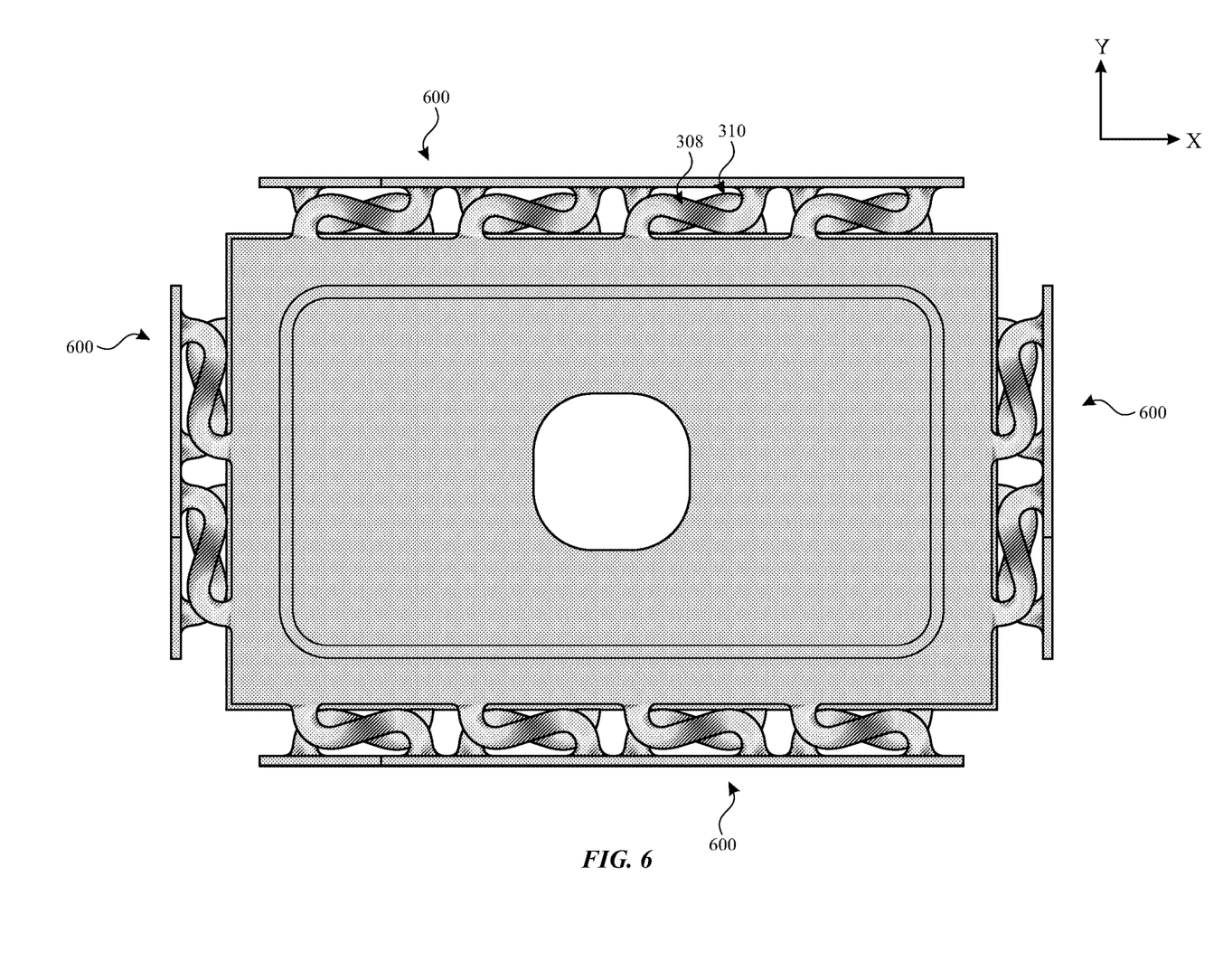
FIG. 6 illustrates a top view of a shaker module in accordance with various aspects of the subject technology.

FIG. 6 illustrates a top view of the springs and moving component of shaker module 200 (e.g., without the frame for clarity) in an implementation that includes four first flat springs 308, each disposed along a corresponding edge of a rectilinear shaker module 200. As shown, the shaker module 200 may be provided in a rectangular arrangement having two opposing long edges and two opposing short edges. In this example, the shaker module 200 includes two first flat springs 308 each disposed along a corresponding one of the opposing long edges, and each having four flat spring elements 412 that extend along a corresponding curved path parallel the x-y plane. In this example, the shaker module 200 also includes two first flat springs 308 each disposed along a corresponding one of the opposing short edges, and each having two flat spring elements 412 that extend along a corresponding curved path within the x-y plane.

In the example of FIG. 6, the shaker module 200 also includes four corresponding second flat springs 310, each disposed along a corresponding edge of a rectilinear shaker module 200, and each separated by a vertical gap (e.g., gap 400) from a corresponding one of the first flat springs 308. In this example, the shaker module 200 includes two second flat springs 310 each disposed along a corresponding one of the opposing long edges, and each having four flat spring elements 406 that extend along a corresponding curved path parallel to the x-y plane. In this example, the shaker module 200 also includes two first flat springs 308 each disposed along a corresponding one of the opposing short edges, and each having two flat spring elements 406 that extend along a corresponding curved path parallel to the x-y plane. As shown, the curved paths of each flat spring element 412 of the first flat springs 308 is a mirror of the curved path of a corresponding one of the flat spring elements 406 of the corresponding second flat spring 310.

In this example, each edge of the shaker module 200 include a first flat spring 308 and a second flat spring 310 that form a gap-separated pair 600 of flat springs. In each gap-separated pair 600, the corresponding curved paths of the plurality of flat spring elements 412 of the first flat spring 308 are each a mirror of a corresponding curved path of one of the plurality of flat spring elements 406 of the second flat spring 310 of the gap-separated pair 600. As illustrated in FIG. 6, a shaker module 200 may include two, three, four, or more than four additional gap-separated pairs of flat springs, in addition to the gap-separated pair shown in FIG. 4, and disposed around the periphery of the interior of the interior opening 302 in the frame 300.

In this arrangement, the shaker module 200 includes two layers of flat springs (a first layer including first flat springs 308 and a second layer including second flat springs 310) that are separated by a vertical gap 400, the flat springs each extending parallel to a common plane. The two layers of gap-separated springs cooperate to allow linear actuation of the moving element in a direction (e.g., the z-direction) perpendicular to the common plane (e.g., the x-y plane) and to prevent rocking of the moving element relative to the common plane.

As illustrated in the examples of FIGS. 1-6, an electronic device such as electronic device 100 may include a shaker module 200 that includes a stiffener plate 312 having a first side 313 that is attached to the interior surface 202 of the housing 106 of the device, and an opposing second side that is attached to the frame 300. The shaker module may also include a coil 314 attached to the opposing second side of the stiffener layer. The electronic device may also include one or more processors (see, e.g., processor(s) 812 of FIG. 8) configured to generate a control signal, and a flexible printed circuit (e.g., connector 204) coupled to the coil 314 and configured to provide the control signal from the one or more processors to the coil.

In one or more implementations, a movable component 306 of the shaker module 200 may include a magnet assembly that includes a side magnet 318 that extends around an outer edge of the coil 314, and a center magnet 322 disposed at least partially within a bore of the coil 314. The shaker module may also include a yoke 324 that extends from the side magnet 318 to the center magnet 322 and positions the center magnet 322 at least partially within the bore of the coil 314. The shaker module may also include a ring plate 316 attached to a top surface of the side magnet 318.

As illustrated in the examples of FIGS. 1-6, in one or more implementations, the electronic device 100 includes a first flat spring 308 that extends, parallel to a plane (e.g., a plane defined by the stiffener plate), from the frame 300 to the movable component 306, and a second flat spring 310 that is separated from the first flat spring along a direction perpendicular to plane, the second flat spring extending, parallel to the first flat spring and to the plane, between the frame 300 and the movable component 306. In one or more implementations, the first flat spring 308 includes a first portion (e.g., outer beam 408) attached to the frame 300, a second portion (e.g., inner beam 410) attached to a top surface of the ring plate 316, and one or more flat spring elements 412 that extend along a curved path between the first and second portions of the first flat spring. In one or more implementations, the second flat spring 310 includes a first portion (e.g., outer beam 402) attached to the frame 300, a second portion (e.g., inner beam 404) attached to a bottom surface of the yoke 324, and one or more flat spring elements 406 that extend along a curved path between the first and second portions of the second flat spring.

Figure 7:
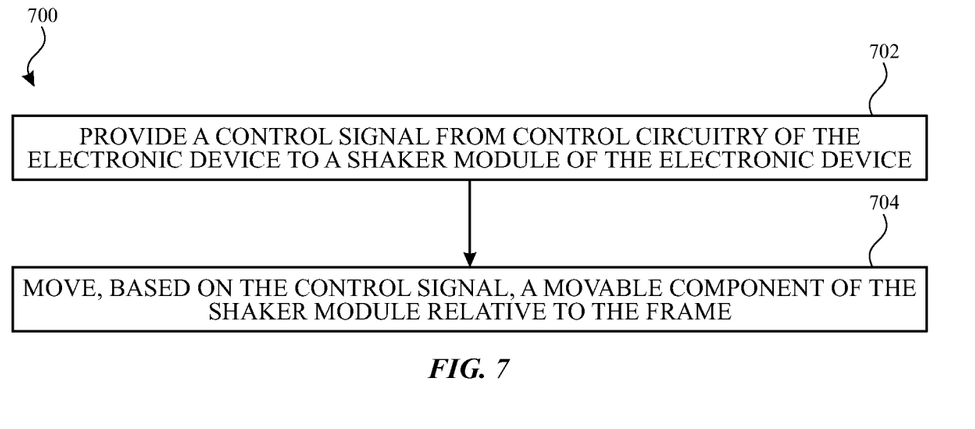
FIG. 7 illustrates a flow chart of example operations for operating a shaker module of an electronic device in accordance with various aspects of the subject technology.

FIG. 7 illustrates a flow diagram of an example process 700 for operating a shaker module of an electronic device in accordance with implementations of the subject technology. For explanatory purposes, the process 700 is primarily described herein with reference to the electronic device 100 of FIG. 1. However, the process 700 is not limited to the electronic device 100 of FIG. 1, and one or more blocks (or operations) of the process 700 may be performed by one or more other components of other suitable devices, including any other device implementing a shaker module such as shaker module 200. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

As illustrated in FIG. 7, at block 702, a control signal may be provided from control circuitry (e.g., one or more processors) of an electronic device such as electronic device 100, to a shaker module (e.g., shaker module 200) of the electronic device. In one or more implementations, the shaker module may include a frame such as frame 300 that defines an interior opening such as interior opening 302 and at least a portion of an outer peripheral edge such as outer peripheral edge 304 of the shaker module 200, where the outer peripheral edge 304 defines a plane that extends through the interior opening. In one or more implementations, the shaker module may also include a movable component, such as movable component 306, disposed within the interior opening in the frame. In one or more implementations, the shaker module may also include a first flat spring such as one of first flat springs 308 that extends, parallel to the plane, from the frame to the movable component. In one or more implementations, the shaker module may also include a second flat spring such as one of second flat springs 310 that is separated from the first flat spring along a direction perpendicular to plane, the second flat spring extending, parallel to the first flat spring and to the plane, between the frame and the movable component. In one or more implementations, the control signal may be provided in coordination with control signals for an audio component or acoustic component (e.g., a speaker) of the electronic device.

At block 704, the movable component may be moved (e.g., actuated), based on the control signal, relative to the frame. For example, moving the movable component may include generating a current, responsive to the control signal, in a coil, such as coil 314, that causes one or more magnets (e.g., the center magnet 322 disposed within the coil 314 and/or the side magnet 318 that extends around the outer periphery of the coil 314) in a magnet assembly of the movable component to move in a direction parallel to an axis of the coil. In one or more implementations, the shaker module (e.g., a stiffener layer of the shaker module) may be attached to a portion of a housing or another structure of the electronic device. In one or more implementations, moving the movable component may cause the portion of the housing or the other structure of the electronic device to move and/or vibrate. The motion and/or vibration of the portion of the housing or the other structure of the electronic device may generate and/or simulate sound, and/or provide tactile output from the electronic device.

For example, the control signal for the shaker module may be configured to cause the shaker module to vibrate a portion of the housing of the electronic device to generate and/or simulate a low-frequency sound that complements or supplements higher frequency sounds being generated by the speaker. For example, the control signals for the speaker may cause the speaker to generate sounds corresponding to a singer's voice or musical instruments such as a guitar, a piano, a snare drum or cymbal, or a trumpet, a string or woodwind instrument (as examples), while the control signal for the shaker module causes the shaker module to (e.g., by actuating a portion of the device housing or another structure of the device) generate and/or simulate sounds corresponding to lower frequency instruments such as a bass guitar or a bass drum. As another example, the control signals for the speaker may cause the speaker to generate sounds corresponding to person's voice in a movie or a video game (as examples), while the control signal for the shaker module causes the shaker module to (e.g., by actuating a portion of the device housing or another structure of the device) generate and/or simulate sounds corresponding to an car crash or an explosion in the movie or video game.

In one or more implementations, the control signal corresponds to low frequency audio output for the electronic device. In one or more implementations, the control signal is provided in coordination with additional control signals for a speaker of the electronic device, the additional control signals corresponding to relatively higher frequency audio output control signals for the electronic device. In one or more implementations, the shaker module is attached to a housing (e.g., housing 106) of the electronic device, and moving the movable component causes motion of at least a portion of the housing based on the control signal.

Figure 8:
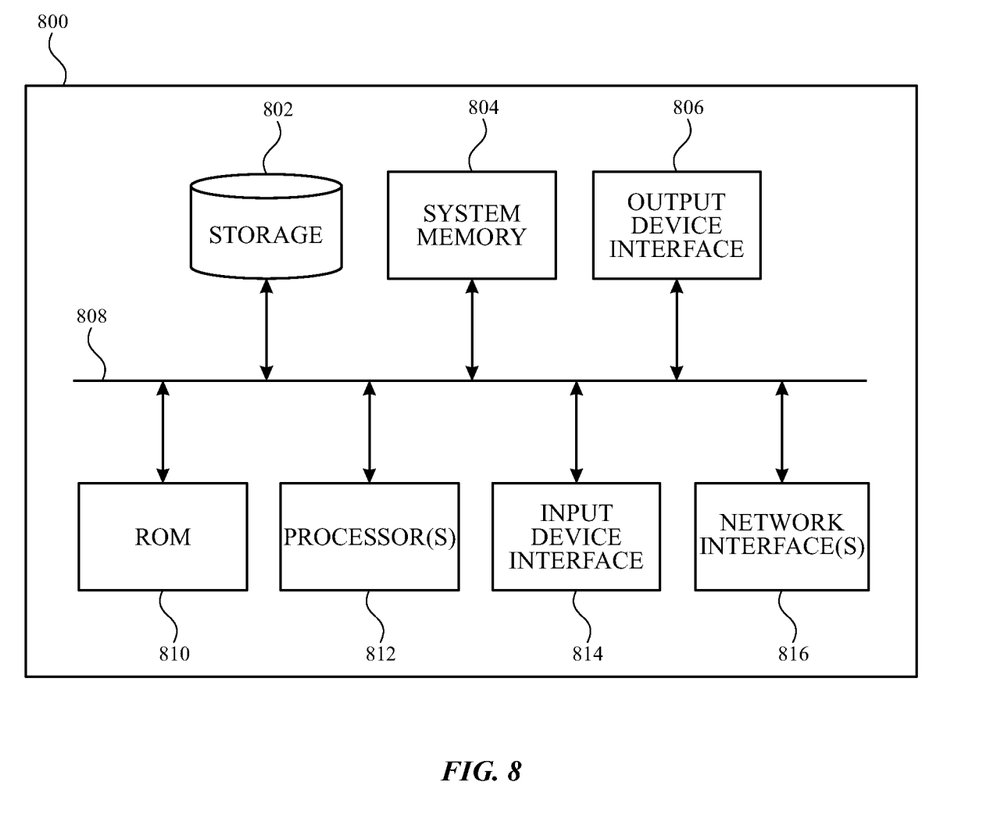
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, one or more of the devices such as electronic device 100 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, shaker modules, audio components, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

In accordance with some aspects of the subject disclosure, a shaker module for an electronic device is provided. The shaker module includes a frame that defines an interior opening and at least a portion of an outer peripheral edge of the shaker module. The outer peripheral edge defines a plane that extends through the interior opening. The shaker module also includes a movable component disposed within the interior opening in the frame. The shaker module also includes a first flat spring that extends, parallel to the plane, from the frame to the movable component. The shaker module also includes a second flat spring that is separated from the first flat spring along a direction perpendicular to plane, the second flat spring extending, parallel to the first flat spring and to the plane, between the frame and the movable component.

In accordance with other aspects of the subject disclosure, an electronic device is provided that includes a housing and a shaker module attached to an interior surface of the housing. The shaker module includes a frame that defines an interior opening and at least a portion of an outer peripheral edge of the shaker module. The outer peripheral edge defines a plane that extends through the interior opening. The shaker module also includes a movable component disposed within the interior opening in the frame. The shaker module also includes a first flat spring that extends, parallel to the plane, from the frame to the movable component. The shaker module also includes a second flat spring that is separated from the first flat spring along a direction perpendicular to plane, the second flat spring extending, parallel to the first flat spring and to the plane, between the frame and the movable component.

In accordance with other aspects of the subject disclosure, a method of operating an electronic device is provided, the method including providing a control signal from control circuitry of the electronic device to a shaker module of the electronic device The shaker module includes a frame that defines an interior opening and at least a portion of an outer peripheral edge of the shaker module. The outer peripheral edge defines a plane that extends through the interior opening. The shaker module also includes a movable component disposed within the interior opening in the frame. The shaker module also includes a first flat spring that extends, parallel to the plane, from the frame to the movable component. The shaker module also includes a second flat spring that is separated from the first flat spring along a direction perpendicular to plane, the second flat spring extending, parallel to the first flat spring and to the plane, between the frame and the movable component. The method also includes moving, based on the control signal, the movable component relative to the frame.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A shaker module for an electronic device, the shaker module comprising:
   a frame that defines an interior opening and at least a portion of an outer peripheral edge of the shaker module, wherein the outer peripheral edge defines a plane that extends through the interior opening;
   a movable component disposed within the interior opening in the frame;
   a first flat spring that extends, parallel to the plane, from the frame to the movable component;
   a second flat spring that is separated from the first flat spring along a direction perpendicular to plane, the second flat spring extending, parallel to the first flat spring and to the plane, between the frame and the movable component, wherein the first flat spring and the second flat spring form a gap-separated pair of flat springs; and
   a plurality of additional gap-separated pairs of flat springs that each extends parallel to the plane between the frame and the movable component.

2. The shaker module of claim 1, wherein the first flat spring and the second flat spring cooperate to permit resilient movement of the movable component in the direction perpendicular to the plane, to prevent movement of the movable component within the plane, and to prevent rotation of the movable component out of the plane.

3. The shaker module of claim 1, further comprising:
   a stiffener plate attached to the frame; and
   a voice coil coupled to the stiffener plate, wherein the movable component comprises a magnet assembly having at least a portion that is positioned within the voice coil by the first flat spring and the second flat spring, and wherein the voice coil is operable to cause movement of the magnet assembly in the direction perpendicular to the plane.

4. The shaker module of claim 3, wherein the first flat spring and the second flat spring each have a thickness in the direction perpendicular to the plane, and are each substantially flat in dimensions parallel to the plane.

5. The shaker module of claim 4, wherein the first flat spring and the second flat spring each include an outer beam, an inner beam, and a plurality of flat spring elements that each extend from the outer beam to the inner beam along a corresponding curved path that is parallel to the plane.

6. The shaker module of claim 5, wherein the outer beam of the first flat spring is insert molded to the frame, the inner beam of the first flat spring is welded to a ring plate of the magnet assembly, the outer beam of the second flat spring is secured within a notch in the frame, and the inner beam of the second flat spring is welded to a yoke of the magnet assembly.

7. The shaker module of claim 5, wherein the corresponding curved paths of each of the plurality of flat spring elements of the first flat spring are a mirror of a corresponding curved path of one of the plurality of flat spring elements of the second flat spring.

8. The shaker module of claim 7, wherein the frame has a thickness in the direction perpendicular to the plane.

9. The shaker module of claim 1, wherein the interior opening extends through a thickness of the frame from a top end of the frame to a bottom end of the frame.

10. An electronic device, comprising:
a housing; and
a shaker module attached to an interior surface of the housing, the shaker module comprising:
a coil attached to a stiffener layer of the shaker module;
a frame that defines an interior opening and at least a portion of an outer peripheral edge of the shaker module, wherein the outer peripheral edge defines a plane that extends through the interior opening;
a movable component disposed within the interior opening in the frame, wherein the movable component comprises a magnet assembly that includes:
a side magnet that extends around an outer edge of the coil; and
a center magnet disposed at least partially within a bore of the coil;
a first flat spring that extends, parallel to the plane, from the frame to the movable component; and
a second flat spring that is separated from the first flat spring along a direction perpendicular to plane, the second flat spring extending, parallel to the first flat spring and to the plane, between the frame and the movable component.

11. The electronic device of claim 10, wherein the shaker module comprises the stiffener layer having a first side that is attached to the frame, and an opposing second side that is attached to the interior surface of the housing.

12. The electronic device of claim 11, wherein the coil is attached to the first side of the stiffener layer.

13. The electronic device of claim 12, further comprising:
one or more processors configured to generate a control signal; and
a flexible printed circuit coupled to the coil and configured to provide the control signal from the one or more processors to the coil.

14. The electronic device of claim 10, wherein the shaker module further comprises:
a yoke that extends from the side magnet to the center magnet and positions the center magnet at least partially within the bore of the coil; and
a ring plate attached to a top surface of the side magnet.

15. The electronic device of claim 14, wherein the first flat spring comprises:
a first portion attached to the frame,
a second portion attached to a top surface of the ring plate, and
a plurality of flat spring elements that extend along a curved path, parallel to the plane, between the first and second portions of the first flat spring; and
wherein the second flat spring comprises:
a first portion attached to the frame,
a second portion attached to a bottom surface of the yoke, and
a plurality of flat spring elements that extend along a curved path, parallel to the plane, between the first and second portions of the second flat spring.

16. The electronic device of claim 10, wherein the interior opening extends through a thickness of the frame from a top end of the frame to a bottom end of the frame.

17. A method of operating an electronic device, the method comprising:
providing a control signal from control circuitry of the electronic device to a shaker module of the electronic device, wherein the shaker module comprises:
a frame that defines an interior opening and at least a portion of an outer peripheral edge of the shaker module, wherein the outer peripheral edge defines a plane that extends through the interior opening;
a movable component disposed within the interior opening in the frame and including a magnet assembly;
a first flat spring that extends, parallel to the plane, from the frame to the movable component; and
a second flat spring that is separated from the first flat spring along a direction perpendicular to plane, the second flat spring extending, parallel to the first flat spring and to the plane, between the frame and the movable component, wherein the first flat spring and the second flat spring each include an outer beam, an inner beam, and one or more flat spring elements that each extend from the outer beam to the inner beam along a corresponding curved path that is parallel to the plane, and
wherein the outer beam of the first flat spring is attached to the frame, the inner beam of the first flat spring is attached to a ring plate of the magnet assembly, the outer beam of the second flat spring is secured within a notch in the frame, and the inner beam of the second flat spring is attached to a yoke of the magnet assembly; and
moving, based on the control signal, the movable component relative to the frame.

18. The method of claim 17, wherein the control signal corresponds to low frequency audio output for the electronic device.

19. The method of claim 18, wherein the control signal is provided in coordination with additional control signals for a speaker of the electronic device, the additional control signals corresponding to relatively higher frequency audio output control signals for the electronic device.

20. The method of claim 17, wherein the shaker module is attached to a housing of the electronic device and wherein moving the movable component causes motion of at least a portion of the housing based on the control signal.

21. The method of claim 17, wherein the interior opening extends through a thickness of the frame from a top end of the frame to a bottom end of the frame.

* * * * *